April 3, 1973     C. A. SUTER     3,725,120

POLYURETHANE CONTAINER

Original Filed Sept. 14, 1966

United States Patent Office 3,725,120
Patented Apr. 3, 1973

3,725,120
POLYURETHANE CONTAINER
Charles A. Suter, Cuyahoga Falls, Ohio, assignor to The Goodyear Tire & Rubber Company, Akron, Ohio
Continuation of application Ser. No. 1,984, Jan. 12, 1970, which is a continuation of application Ser. No. 579,570, Sept. 14, 1966. This application Dec. 13, 1971, Ser. No. 207,639
Int. Cl. B44d 1/02
U.S. Cl. 117—104 R
9 Claims

ABSTRACT OF THE DISCLOSURE

A composite structure and method of preparation comprising essentially a layer of a cured polyurethane adhered to a layer of a hydrocarbon barrier. It is preferred that the barrier layer be applied in a solution with a solvent comprising at least one liquid ketone to a partially cured polyurethane following which the polyurethane is further cured, the said barrier layer comprising a polymer of from about 50 to about 100 mole percent of vinylidene chloride and correspondingly of up to about 50 mole percent of a material selected from the group consisting of vinyl chloride and acrylonitrile. The composite structure and method of preparation have particular utility in the fabrication of hydrocarbon containers such as fuel tanks.

---

Figure 1:
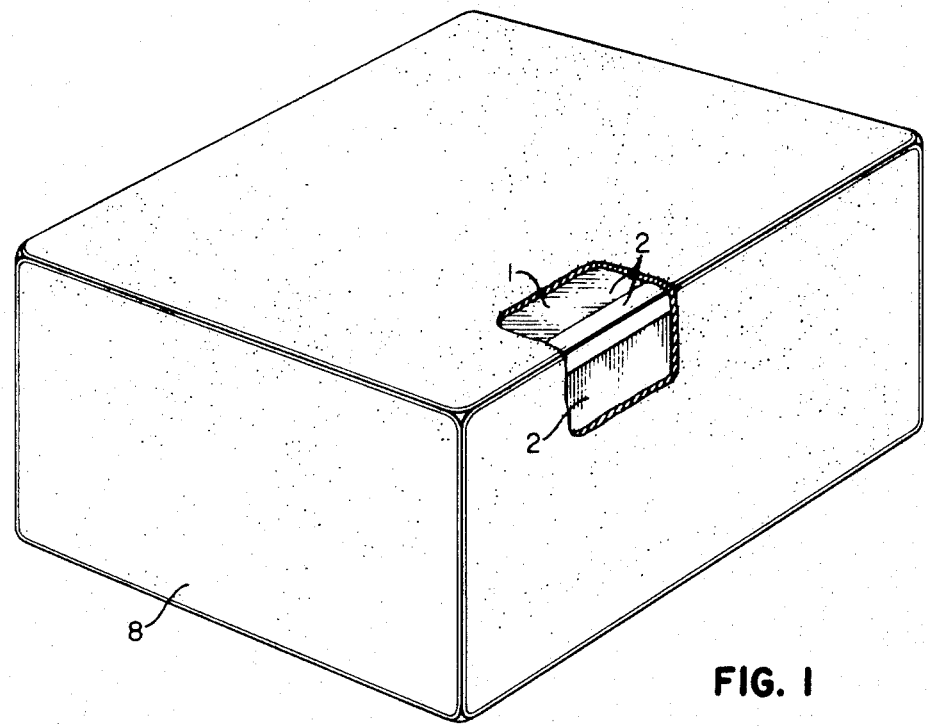

This is a continuation of application Ser. No. 1,984 filed Jan. 12, 1970, now abandoned, which is a streamline continuation of application Ser. No. 579,570 filed Sept. 14, 1966, now abandoned.

This invention relates to a composite structure having improved resistance to the diffusion of liquid hydrocarbons and hydrocarbon vapors. More particularly, this invention relates to a method of preparing a composite structure having a hydrocarbon barrier and to the composite structure.

Various polyurethanes can be used to prepare structures to contain liquid hydrocarbons. Such structures are usually in the form of containers and pipes as well as liners for various containers and pipes.

Polyurethanes are particularly useful structural materials for preparing containers for hydrocarbons since the various structures can be prepared from liquid polyurethane reaction mixtures by casting, dipping, brushing or spraying the liquid polyurethane reaction mixture onto a form and allowing the said reaction mixture to cure to a solid polyurethane. Thus, polyurethanes are uniquely highly versatile in preparing various structures for containing hydrocarbons. However, a serious disadvantage has been found when polyurethanes have been used to contain certain liquid hydrocarbons, and various mixtures which include liquid hydrocarbons, in that many hydrocarbons and their vapors tend to diffuse through the polyurethane causing a loss of hydrocarbon from the container and, thus, causing hydrocarbon vapors to be present adjacent to the container, thereby creating a dangerous fire and explosive hazard. The application of an effective barrier to a hydrocarbon-containing polyurethane structure to prevent the diffusion of hydrocarbons through the polyurethane would greatly enhance its use as a structural material for liquid hydrocarbon containers.

Typically, nylon coatings have been used as liquid hydrocarbon barriers for polyurethane containers for liquid hydrocarbons, although they are deficient in several respects. Nylon is usually applied to the polyurethane as an alcohol or alcohol and water solution. Both alcohol and water can interfere with the curing of the polyurethane and can degrade the polyurethane. Generally the nylon coat is adhered to the polyurethane only with difficulty. Furthermore, many hydrocarbons contain small amounts of water which will tend to cause a failure of the adhesion of the nylon coat to the polyurethane.

Therefore, it is an object of this invention to provide a composite structure for containing hydrocarbons comprising a polyurethane having a hydrocarbon barrier and to provide a method of preparing such a composite structure.

According to this invention, it has been found unexpectedly that a polyurethane container for liquid hydrocarbons having improved resistance to the diffusion of hydrocarbons comprises at least one wall of polyurethane having adhered thereto a coating comprising a polymer of from about 50 to about 100 mol percent of vinylidene chloride and correspondingly up to about 50 mol percent of a compound selected from the group consisting of vinyl chloride and acrylonitrile.

Figure 2:
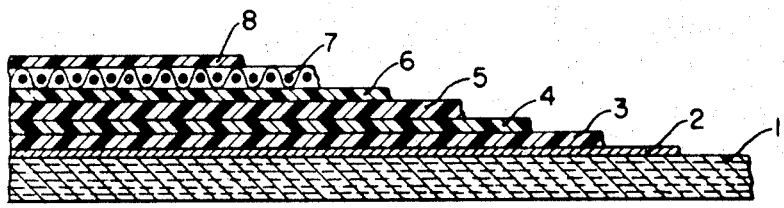

The advantages and objects of this invention may be more readily understood by reference to the drawings wherein FIG. 1 is a perspective view of a fuel tank and FIG. 2 is a partial fragmented view of a wall of the tank.

Reference to the figures shows a building form 1 which can be various materials such as metal, a plastic, wood, paper, plaster, or cardboard in the general shape of the tank to be prepared. It is usually desired that the building form will not tightly adhere to the polyurethane coat to be applied to it when the polyurethane coat is cured. Usually the building form is coated with a releasing agent 2, such as wax or other well known materials and then at least one spray coat of a polyurethane reaction mixture 3, 4 is applied. The polyurethane coats are built up to a desired thickness and usually allowed to dry and at least partially cure until they are tack free. To the polyurethane coat is applied a coating of the fuel barrier 5. The fuel barrier coat is usually allowed to dry at least until it is tack free. Then it is usually desired to apply at least one spray coat of a polyurethane reaction mixture 6 to the barrier coat. It is to be appreciated that a fabric covering 7 can be applied to the building form, to the polyurethane coats or to the barrier material to add strength to the polyurethane structure. It is also to be understood that the barrier material coat can be applied to the building form or to any of the polyurethane coats. It should be apparent that additional spray coats of a polyurethane reaction mixture 8 can be applied to increase the thickness of the container wall. The various coats of polyurethane can be dried and cured within a relatively short time, with the application of heat, if desired, usually within about an hour or less depending upon the nature of the polyurethane reaction mixture and the catalyst utilized. Then the building form is removed from the prepared polyurethane container.

Thus, in the practice of this invention, a useful composite structure comprising essentially of a layer of a cured polyurethane adhered to a layer of a hydrocarbon barrier, the said barrier layer comprising a polymer of from about 50 to about 100 mol percent of vinylidene chloride and correspondingly of up to about 50 mol percent of a material selected from the group consisting of vinyl chloride and acrylonitrile.

The improved container of this invention for liquid hydrocarbons having a hydrocarbon barrier is prepared by applying at least one coat of a hydrocarbon barrier solution to a polyurethane inner liner, and drying the said coat until it is essentially solvent free. If desired, the said polyurethane inner liner can be adjacent to the said liquid hydrocarbon. Also, the improved container of this invention can be prepared by spray coating at least one coat of a liquid polyurethane reaction mixture onto a building form which form does not tightly adhere to the polyurethane reaction mixture when the said polyurethane reaction mixture is cured, removing at least a portion of the solvent from the said polyurethane reaction mixture and at least partially curing the said reaction mixture, applying at least one coat of a hydrocarbon barrier solution to the polyurethane coat, drying the hydrocarbon barrier until it is essentially solvent-free, and removing the prepared container from the said building form.

In this invention, the composite structure can be used, for example, as a container for various hydrocarbons such as a fuel tank or as a pipe used for transporting various hydrocarbons and their mixtures.

The hydrocarbon barrier used in the structure of this invention is a polymer prepared from vinylidene chloride, vinyl chloride and acrylonitrile. Representative of such polymers are the polymers comprising from about 50 to about 100 mol percent units derived from vinylidene chloride, from about 0 to about 50 mol percent units derived from vinyl chloride and from 0 to 50 mol percent units derived from acrylonitrile. It is usually preferable that the polymer comprises from about 65 to about 85 mol percent units derived from vinylidene chloride, from about 15 to about 35 mol percent units derived from vinyl chloride, and from 15 to about 35 mol percent units derived from acrylonitrile. A particularly desirable hydrocarbon barrier coat comprises a copolymer of vinylidene chloride and acrylonitrile.

The properties of these polymers vary widely depending upon the monomers used, the ratio of monomers used, polymerization conditions, and the degree of polymerization. For example, their tensile strengths at ultimate elongation can range from about 1,500 to about 40,000 pounds per square inch, their ultimate elongations can range from about 0 to about 350 percent, their specific gravities can range from about 1.5 to about 1.75, and their refractive indices can range from about 1.5 to about 1.65. The polymers are usually characterized by being generally soluble in cyclic ethers and ketones and generally insoluble in chlorinated hydrocarbons, aliphatic hydrocarbons, aromatic hydrocarbons, and alcohols.

In the practice of this invention, the hydrocarbon barrier is usually applied to the polyurethane as a solution by spraying, brushing or dipping although a layer of the hydrocarbon barrier can be laminated to the polyurethane to form a laminate. It is usually desired that the layer of copolymer barrier is from about 0.1 to about 10 mils in thickness and more preferably from about 0.5 mil to about 2 mils in thickness.

When the barrier coat is applied as a solution, the polymer is usually dissolved or dispersed in various solvents representative of which are ketones and their mixtures which are liquid at about 20° C. Representative ketones are acetone and methyl ethyl ketone. Various other liquids can be used as diluents in conjunction with such solvents which themselves are not good solvents for the said copolymer, such as toluene and various alcohols to improve the spraying or drying properties of the copolymers. Representative alcohols are methyl alcohol, ethyl alcohol, isopropyl alcohol, normal propyl alcohol, isobutyl alcohol, normal butyl alcohol, the amyl alcohols, the hexyl alcohols and the heptyl alcohols.

Normally the hydrocarbon solution contains from about 1 to about 70 parts by weight of the polymer per 100 parts by weight of solvent. Dilute solutions of from about 3 to about 20 parts by weight of the polymer per 100 parts of the solvent are usually preferred where the solutions are to be applied by ordinary methods such as by brushing and by spraying. It is to be appreciated that if the solvent contains large amounts of the diluents such as toluene and alcohol or if the viscosity of the solutions are high the higher concentrations are usually workable only with difficulty and special procedures must be applied such as the use of higher temperatures and pressures above atmospheric.

The composite structure of this invention having a hydrocarbon barrier can be used to contain various hydrocarbons and their mixtures exemplary of which are petroleum and coal tar distillates and various fuels such as gasoline and kerosene and various lubricating and fuel oils having boiling points at atmospheric pressure ranging from about −10° C. to about 400° C. and usually from about 0° C. to about 150° C. Suitable hydrocarbons are saturated aliphatic, saturated cycloaliphatic, unsaturated aliphatic, unsaturated cycloaliphatic, and aromatic hydrocarbons and mixtures of such hydrocarbons. Representative examples of these and other various saturated hydrocarbons are aliphatic hydrocarbons such as the butanes, the pentanes, the hexanes, the heptanes, the octanes and the nonanes; aromatic hydrocarbons such as benzene, toluene, and xylene; saturated cycloaliphatic hydrocarbons such as cyclohexane; and various unsaturated hydrocarbons representative of which are olefins such as the butenes, the pentenes, the hexenes, the heptenes, the octenes, and the nonenes; and diolefins such as the butadienes, the pentadienes, isoprene, the hexadienes, the heptadienes, and the octadienes. Various mixtures of unsaturated, saturated and aromatic hydrocarbons can also be contained.

Suitable building form surfaces when used for preparing the containers of this invention are surfaces to which the polyurethane reaction mixture, when cured, will not tightly adhere. Exemplary surfaces are those prepared from materials known to those skilled in the art which do not tightly adhere to the cured polyurethane such as polyethylene and polypropylene. Further exemplary surfaces are those formed by coating the building form with various suitable release agents and parting films also known to those skilled in the art. Representative and suitable release agents are those that do not adhere to the polyurethane when cured and which do not react with the polyurethane reactants to reduce the flexibility, tear tensile strength and cold temperature properties of the cured polyurethane composition. Any of the many releasing agents or parting agents known to those skilled in the art to be useful in preparing polyurethane castings may be used in this invention provided they meet the above requirements. Some of the many suitable release agents include the polyvinylalcohols such as the ones available under the trade name Gelvatol–40–10 and Gelvatol–40–20 as well as Elvanol 15–05. These polyvinyl alcohols are water soluble and do not detrimentally effect the interfacial properties of the cured polyurethane composition. Alternately, the building form can be coated with a polyethylene or polypropylene wax coating and this coating can serve as the release agent. Various other waxes can also be used.

In preparing a container according to this invention it is usually desired that sufficient spray coats of a polyurethane reaction mixture are applied over the building form to provide an inner polyurethane layer having a wall thickness of from about 1 to about 50 mils and to the hydrocarbon barrier layer to provide an outer polyurethane layer of from about 1 to about 50 mils thickness. If it is desired to apply more than one layer of fabric to the inner polyurethane coating, a polyurethane spray coating of from about 1 to about 50 mils thickness can be applied between the layers of fabric. Each successive coat of polyurethane can be cured or partially cured before the addition of the next coat.

The polyurethane reaction mixture used in this invention comprises a reactive hydrogen-containing polymeric material and an organic polyisocyanate. It is to be understood that the polyurethanes referred to in this specification may also contain polyurea linkages. Usually a solvent is added to the reaction mixture so that it will be in the form of a fluid mixture or solution. Generally, sufficient solvent is added to form a solution containing from about 40 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 55 percent or higher is generally desired.

The reactive hydrogen-containing polymeric material used comprises at least one member selected from the group consisting of polyester polyols, polyesteramides, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4 - chloro - 1,3 - phenylene diisocyanate, 4,4'-tetramethylene diisocyanate, 1,6-hexamethylene diisocyanate, 1,10-decamethylene diisocyanate, 1,4-cyclohexylene diisocyanate, 4,4' - methyl - one-bis(cyclohexylisocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate, are preferred. For convenience, these diisocyanates are referred to as TDI, MDI and TODI, respectively.

The polyurethane polymers of this invention are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amine groups. This prepolymer is then usually dissolved or dispersed in the solvent to form a solution or dispersion which is then mixed with a catalyst, chain extending agent, and/or a crosslinking agent to form a polyurethane reaction mixture.

Other methods known to those skilled in the art of preparing polyurethane reaction mixtures with or without solvents being present may also be used.

A catalyst can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids.

Agents which promote chain extension and crosslinking of the polymer are also useful and are sometimes known as curing agents. Aromatic diamines, hydrocarbon diols, such as ethylene glycol and propylene glycol, hydroxylamines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general the bifunctional materials yield products having superior spraying properties. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols such as ethylene glycol, 1,3-propane-diol, 1,4-butane-diol and glycerol; aliphatic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-amino-benzyl aniline, and o- and p-aminodiphenyl-amine; hydroxy amines such as triethanol amine, 2-amino-ethyl alcohol, 2-amino-1-naphthol and m-aminophenyl; hydroxy carboxylic acids such as glycolic acid and alpha-hydroxy propionic acid; and amino carboxylic acids such as amino acetic acid and amino benzoic acid. The preferred crosslinking agents are butane diol and the chloroamines such as ortho-dichlorobenzidine and methylene bis orthochloroaniline. The latter two chloroamines above are sometimes referred to herein for convenience as ODCB and MOCA, respectively. Generally the chain extending or crosslinking agents having acid groups tend to form a cellular polyurethane and thus, form a container having buoyancy.

A method for selecting the diisocyanates and diamines which form sprayable liquid reaction mixtures that can be mixed and used with a single container-type spray gun is the boiling methylene chloride turbidity test. By this method 0.2 to 0.5 molar solution of the diisocyanate and diamine are made with methylene chloride. Equal molar amounts of the respective methylene chloride solutions of diisocyanate and diamine are raised to the boiling temperature and mixed. If a turbidity develops inside of 15 to 30 seconds, this combination of diisocyanate and diamine will not yield a reaction mixture which can be sprayed under normal conditions because of the high reaction rate. However, this combination can be sprayed successfully at a lower temperature or by using a spray gun having a mixing head. On the other hand, those mixtures of diisocyanate and diamine which do not produce a turbidity within about 15 to 30 seconds can be sprayed under normal spray conditions familiar to those skilled in the art.

Some combinations of polyisocyanates and crosslinking agents especially well suited for use in this invention are:

TDI—MOCA
TDI—ODCB
TDI—APS [1]
TODI—MOCA
TODI—ODCB
TODI—APS
MDI—MOCA
MDI—ODCB
Naphthalene diisocyanate—MOCA
Naphthalene diisocyanate—ODCB
Naphthalene diisocyanate—APS
4,4'-diphenyl diisocyanate—MOCA
4,4'-diphenyl diisocyanate—ODCB
4,4'-diphenyl diisocyanate—APS

[1] APS is bis(3,3'-amino phenyl) sulfone.

Any of the non-reactive solvents normally used in making paints which are suitable for spraying are useful in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, lower nitroparaffins, etc. Mixtures of solvents may be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about one to two parts of pigment per hundred parts of prepolymer by weight.

Submicroscopic pyrogenic silica has been found to be an effective thixotropic agent. This material is prepared by the vapor phase hydrolysis of silicon tetrachloride. Such silica, sold under the trademark CAB-O-SIL by Godfrey L. Cabot, Inc., is useful as a thixotropic agent in the sprayable polyurethane compositions when used in about 0.1 to 10 parts by weight per 100 parts of the prepolymer in the solution. The preferred amount is from about 0.5 to about 4 parts by weight. This range of pyrogenic silica gives improved thixotropic properties to the resulting sprayable composition.

EXAMPLE 1

A rectangular cardboard box having the dimensions of 24 x 24 x 24 inches was coated with a release coat solution of 25 parts of polyvinyl alcohol obtained as Elvanol 51-05 from the E. I. du Pont de Nemours and Company and 100 parts of water. The release coat was dried at about 20° C. for about 20 hours. A polyurethane container having a hydrocarbon barrier was prepared by the following method. Over the release coat a coat of a polyurethane liquid reaction mixture was sprayed. The coat of the polyurethane liquid reaction mixture was allowed to dry at about 20° C. to 30° C. for about 6 hours until the coat was essentially solvent-free. During this drying period the solvent evaporated and a certain amount of curing of the polyurethane coat occurred to form a polyurethane coat having a thickness of about 10 mils.

Onto the polyurethane coat was sprayed a solution of the hydrocarbon barrier material. The barrier material solution was prepared by first mixing 100 parts of a commercial copolymer of vinylidene chloride and acrylonitrile comprising at least about 50 mol percent of units derived from vinylidene chloride and correspondingly at least about 10 mol percent of units derived from acrylonitrile, with 640 parts of methyl ethyl ketone and then adding 1000 parts of toluene. The barrier solution coat was allowed to dry at about 20° C. to 30° C. for about 20 minutes until a portion of the solvent evaporated. Two successive coats of the barrier solution were applied and each allowed to dry at about 20° C. to about 30° C. for about 20 minutes. The barrier solution coats were then allowed to dry at about 20° C. to about 30° C. for about 16 hours until they were essentially solvent free to form a hydrocarbon barrier coating having a thickness of about 2 mils. Onto the hydrocarbon barrier coating was sprayed a coat of a polyurethane liquid reaction mixture which was allowed to dry and at least partially cure at about 20° C. to 30° C. for about 6 hours to form a polyurethane coat having a thickness of about 10 mils. The polyurethane container having the hydrocarbon barrier was then further treated in a hot air oven for 3 hours at about 100° C. to further cure the polyurethane. The rectangular cardboard box and its release coat was removed from the prepared container by spraying water inside the cardboard box to disintegrate the said cardboard box.

The sprayable polyurethane liquid reaction mixtures as used in this example were prepared by mixing a prepolymer mixture also herein called Component 1 with a curative solution also herein called Component 2. Component 1 was prepared by mixing 5.3 parts of cellulose acetate-butyrate with 394.4 parts of methyl ethyl ketone. To this mixture was added 14.1 parts of carbon black and 40.1 parts of submicroscopic pyrogenic silica obtained as CAB-O-SIL from the Godfrey L. Cabot Inc. To this mixture was then added 271 parts of toluene and 1277.3 parts of a prepolymer. Component 2, the curative solution, was prepared by mixing 14.1 parts of mercaptobenzothiazole, 134.95 parts of methylene-bis-ortho-chloroaniline, and 299.5 parts of methyl ethyl ketone.

The following prepolymers are suitable for use in the formation of Component 1 of this example:

Prepolymer A

A reaction product of 2 mols of tolylene diisocyanate with about 1 mol of a polyester having a molecular weight of from about 1000 to about 2000 formed by condensing an excess of ethylene glycol with adipic acid.

Prepolymer B

Same as Prepolymer A except that about 1.4 mols of the diisocyanate are reacted with the polyester.

Prepolymer C

Same as Prepolymer A except propylene glycol was used to produce the polyester instead of ethylene glycol.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a polytetramethylene ether glycol having a molecular weight of about 3000.

Prepolymer G

The reaction product of 2 mols of toluene diisocyanate with 1 mol of a polyester having a molecular weight of from about 1000 to about 2000 prepared by the condensation of adipic acid with an excess of a mixture consisting of 80 percent by weight ethylene glycol and 20 percent by weight propylene glycol.

Prepolymer H

The reaction product of 2 mols of toluene diisocyanate with 1 mol of a mixture of polyesters having molecular weights of about 1500 to about 2000 prepared by the polyester mixture comprised ⅔ by weight of a polyester prepared by the condensation of adipic acid with an excess of a mixture consisting of 80 percent by weight ethylene glycol and 20 percent by weight propylene glycol and ⅓ by weight of a polyester prepared by the condensation of 1,4-butane diol and adipic acid.

Prepolymer I

The reaction product of 2 mols of toluene diisocyanate with 1 mol of a mixture of polyesters wherein the said mixture of polyesters comprises 50 percent by weight of polyester having a molecular weight of about 1800 to about 2000 prepared by the condensation of 1,4-butane diol with azelaic acid, and 50 percent by weight of a polyester having a molecular weight of from about 800 to about 1200 prepared by the condensation of 1,4-butane diol and adipic acid.

In this particular example, Prepolymer H was used to prepare a sprayable polyurethane liquid reaction mixture used for the polyurethane layers.

It is to be understood that the hydrocarbon container of this invention can be prepared without the aid of a building form such as by the methods described in United States patent application Ser. No. 274,280 filed Apr. 19, 1963. For example, if the size or shape of the desired container is such that the expense of constructing a form is unwarranted, the said container can be prepared by spraying one or more coats of a liquid polyurethane reaction mixture onto a suitable fabric, such as a polyester, polyamide, modified cellulose, or cotton fabric, the said fabric then becoming part of the container, and then coating said polyurethane coat with the hydrocarbon barrier. Additional layers of liquid polyurethane or polyurethane reaction mixture can be applied if desired.

Other polymers suitable for use in this example as hydrocarbon barrier materials are polymers of from about 50 to about 100 mol percent of vinylidene chloride and correspondingly of up to about 50 mol percent of a material selected from the group consisting of vinyl chloride and acrylonitrile.

It is a particular advantage of this invention that good adhesion can be obtained between the hydrocarbon barrier material herein described and the various polyurethanes herein described where the said polyurethanes are in their uncured state, at least partially cured, or in their cured state, by applying a solution of the said barrier material to the said polyurethanes.

The sprayable polyurethane compositions of this invention have thus far been described as comprising a prepolymer, a solvent, a curing agent and certain other additive agents. Although the embodiments described previously herein illustrate the best method of accomplishing this invention, those skilled in the art would realize that a sprayable reaction mixture comprising a reactive hydrogen containing polymeric material and an organic diisocyanate in sufficient solvent can be mixed and then sprayed, even immediately, if desired, upon the building form. Then in a very short time the spray coat will react to form the prepolymer in situ on the building form. Hence, the prepolymer which now forms the coating can be cured by exposure to an atmosphere which contains vapors such as those of water, diamine or glycol to produce a polyurethane composition of a nature simulating that obtained by the previously described embodiments.

EXAMPLE 2

A polyurethane test sample was prepared for a hydrocarbon diffusion test. The sample was prepared by first spraying a coat of liquid polyurethane reaction mixture onto cardboard, which had a release coating of polyvinyl alcohol. The coat of polyurethane reaction mixture was allowed to dry and at least partially cure at about 20° C. to 30° C. for about 6 hours until the coat was essentially solvent-free to form a polyurethane having a thickness of about 10 mils. A portion of the polyurethane was then brush coated with two coats of a mixture of 90 parts of methyl ethyl ketone and 10 parts of a commercial copolymer of vinylidene chloride and acrylonitrile comprising at least about 50 mol percent of units derived from vinylidene chloride and correspondingly at least about 10 mol percent of units derived from acrylonitrile. Each coat of the solution was allowed to dry at about 20° C. to 30° C. for about 20 minutes until it was essentially solvent free to form a hydrocarbon barrier coat having a thickness of about 2 mils. The sample, including the portion of polyurethane with and the portion without the hydrocarbon barrier, was then cured in a hot air oven for 2 hours at about 102° C. and was then removed from the cardboard. The polyurethane reaction mixtures used in preparing the sample were prepared according to the method of Example 1 using Prepolymer H. The portion of the polyurethane without the hydrocarbon barrier coat is called Sample A and the portion having the hydrocarbon barrier coat is called Sample B for the purposes of this example.

A cylindrical cup was used in performing the diffusion test which had an inside height of 2.47 inches and an inside diameter of 2.00 inches. Into the cup was placed 100 cubic centimeters of a mixture comprising 70 parts by weight of isooctane and 30 parts by weight of toluene. In the diffusion test, portions of the sample were securely placed over the open end of the cylindrical cup. The cup was then inverted with the test sample now being on the bottom of the cylinder. The cup and test sample were maintained at 77° F. in an atmosphere having a relative humidity of 40%. The cup and sample were weighed at the start of the test and at an interval of time of 72 hours. Diffusion of the hydrocarbon through the test sample is expressed in fluid ounces per square foot per 24 hours. It is equal to the gram loss of the test sample per 24 hours multiplied by a Factor K. The Factor K is defined as follow:

$$K = \frac{144}{(sp. \ gr.)(29.573)(3.142)R^2}$$

Where
sp. gr.=specific gravity of test fluid at 77° F.
R—inside radius of test cup expressed in inches The following results were obtained from the test samples A and B.

DIFFUSION (FLUID OUNCES/SQUARE FOOT/24 HOURS)
Test sample:
A ---------------------------------------- 0.554
B ---------------------------------------- 0.002

The polymers described in this specification as hydrocarbon barrier materials generally have an intrinsic viscosity in the range of from about 0.3 to about 5 and usually in the range of from about 0.5 to about 1.5 determined at 30° C. from a solution of 0.7 gram of the polymer in 100 cubic centimeters of methyl ethyl ketone.

While certain representative embodiments and details have been shown for the purpose of illustrating the invention it will be apparent to those skilled in this art that various changes and modifications may be made therein without departing from the spirit or scope of the invention.

What is claimed is:

1. A container for liquid hydrocarbons having at least one wall which comprises a layer of a cured polyurethane adhered to a layer of a hydrocarbon barrier, the said barrier layer comprising a polymer of from about 50 to about 100 mole percent of vinylidene chloride and correspondingly of up to about 50 mole percent of at least one material selected from the group consisting of vinyl chloride and acrylonitrile, where the said wall is prepared with said barrier adhered to said polyurethane by the method which comprises the successive steps of
 (A) applying at least one coat on a suitable form of a liquid polyurethane reaction mixture prepared from
  (1) at least one reactive hydrogen-containing polymeric material selected from castor oil and materials having a molecular weight between about 700 and about 5000 selected from the group consisting of polyester amides, polyether polyols and dihydroxyl-terminated polymers of conjugated diene hydrocarbons,
  (2) an organic polyisocyanate, the overall molar ratio of the isocyanato groups of the polyisocyanate to the reactive hydrogens of the hydrogen-containing polymeric material being between about 1.1/1 and about 12/1.
  (3) at least one curing agent selected from bifunctional reactants consisting of glycols, diamines having primary amino groups, diamines having secondary amino groups, dicarboxylic acids, hydroxy amines, hydroxy-carboxylic acids, and amino carboxylic acids in a ratio of from about 0.8/1 to about 1.0/1 of amine, hydroxyl, and acid groups to the isocyanate groups in excess of the reactive hydrogen-containing polymeric material, and
  (4) sufficient amount of solvent to give a sprayable mixture,
 (B) curing the said reaction mixture coating and drying until substantially solvent-free,
 (C) applying at least one liquid barrier coat to the said cured polyurethane where the said liquid barrier coat comprises the said barrier layer polymer in a solvent, and
 (D) drying the said barrier layer coat to give a barrier layer.

2. A composite structure according to claim 1 wherein the said hydrocarbon barrier layer comprises a polymer of vinylidene chloride and acrylonitrile.

3. A composite structure according to claim 2 wherein the said polymer of vinylidene chloride and acrylonitrile has a specific gravity of from about 1.5 to about 1.75.

4. A composite structure according to claim 2 wherein the said layer of polyurethane is prepared from a reaction mixture comprising a polyester polyol, an organic diisocyanate, and a diamine.

5. The container of claim 1 where the said liquid polyurethane reaction mixture is prepared from
 (A) a prepolymer formed by reacting the said reactive hydrogen-containing polymeric material and the organic polyisocyanate,
 (B) at least one of the said compounds selected from bifunctional reactants consisting of glycols, and diamines having primary amino groups and
 (C) sufficient non-reactive solvent to give a sprayable mixture.

6. The container of claim 5 where the said reactive hydrogen-containing polymeric materials are selected from polyester polyols and polyether polyols, the said organic polyisocyanate is a diisocyanate, and where the said compound selected from bifunctional reactants is a diamine having primary amino groups.

7. A method of preparing at least one wall of the container for liquid hydrocarbons of claim 1 with said barrier adhered to said polyurethane which comprises
 (A) applying at least one coat on a suitable form of a liquid polyurethane reaction mixture prepared from
  (1) at least one reactive hydrogen-containing polymeric material selected from castor oil and materials having a molecular weight between about 700 and about 5000 selected from the group consisting of polyester polyols, polyester amides, polyether polyols and dihydroxyl-terminated polymers of conjugated diene hydrocarbons,
  (2) an organic polyisocyanate, the overall molar ratio of the isocyanato groups of the polyisocyanate to the reactive hydrogens of the hydrogen-containing polymeric material being between about 1.1/1 and 12/1,
  (3) at least one curing agent selected from bifunctional reactants consisting of glycols, diamines having primary amino groups, diamines having secondary amino groups, dicarboxylic acids, hydroxy amines, hydroxycarboxylic acids, and amino carboxylic acids, in a ratio of from about 0.8/1 to about 1.0/1 of amine, hydroxyl, and acid groups to the isocyanate groups in excess of the reactive hydrogen-containing polymeric material, and
  (4) sufficient amount of solvent to give a sprayable mixture,
 (B) curing the said reaction mixture coating and drying until substantially solvent-free,
 (C) applying at least one liquid barrier coat to the said cured polyurethane where the said liquid barrier coat comprises a barrier layer polymer in a solvent and the said barrier layer polymer comprises a polymer of from about 50 to about 100 mole percent of vinylidene chloride and correspondingly up to about 50 mole percent of at least one material selected from the group consisting of vinyl chloride and acrylonitrile and
 (D) drying the said barrier layer coat to give a barrier layer.

8. A method according to claim 7 wherein the said polyurethane layer is formed from a reaction mixture prepared from a polyester polyol, an organic diisocyanate and a diamine.

9. A method according to claim 7 wherein the said hydrocarbon barrier layer comprises a polymer selected from a polymer of vinylidene chloride and from a polymer comprising from about 65 to about 85 mole percent units derived from vinylidene chloride and from about 15 to about 35 mole percent units derived from vinyl chloride and from about 15 to about 35 mole percent units derived from acrylonitrile, and where the barrier layer is applied to the polyurethane from a solution of at least one of the said polymers in a solvent comprising a liquid ketone, and then removing the solvent therefrom.

References Cited
UNITED STATES PATENTS 2,558,807  7/1951  Bailey _____ 161—405 X
2,715,085  8/1955  Roger _____ 161—257

EDWARD G. WHITBY, Primary Examiner

U.S. Cl. X.R.

117—94, 113, 138.8 D, 161 UZ; 161—190, 405; 220—64